United States Patent [19]

Nagase et al.

[11] 4,421,085

[45] Dec. 20, 1983

[54] METHOD OF AND APPARATUS FOR CONTROLLING THE IGNITION TIMING OF AN INTERNAL COMBUSTION ENGINE

[75] Inventors: Masaomi Nagase, Toyota; Hideo Miyagi, Okazaki, both of Japan

[73] Assignee: Toyota Jidosha Kogyo Kabushiki Kaisha, Toyota, Japan

[21] Appl. No.: 303,495

[22] Filed: Sep. 18, 1981

[30] Foreign Application Priority Data

Sep. 25, 1980 [JP] Japan .................................. 55-132268

[51] Int. Cl.³ .................................................. F02P 5/04
[52] U.S. Cl. ...................................... 123/416; 123/421
[58] Field of Search ............... 123/416, 417, 418, 421, 123/424

[56] References Cited

U.S. PATENT DOCUMENTS

| | | | |
|---|---|---|---|
| 3,543,738 | 12/1970 | Barber | 123/117 |
| 3,901,201 | 8/1975 | Mizuguchi et al. | 123/117 R |
| 4,022,170 | 5/1977 | Crall et al. | 123/117 R |
| 4,077,372 | 3/1978 | Masta | 123/416 |
| 4,104,998 | 8/1978 | Fenn | 123/117 R |
| 4,112,891 | 9/1978 | Spaulding et al. | 123/117 A |
| 4,131,098 | 12/1978 | Daniels et al. | 123/117 R |
| 4,178,893 | 12/1979 | Aoki | 123/117 D |
| 4,232,642 | 11/1980 | Yamaguchi et al. | 123/416 |
| 4,262,644 | 4/1981 | Walker et al. | 123/418 |
| 4,276,602 | 6/1981 | Obara et al. | 364/431 |
| 4,359,988 | 11/1982 | Matsubara | 123/424 |

Primary Examiner—Tony M. Argenbright
Attorney, Agent, or Firm—Cushman, Darby & Cushman

[57] ABSTRACT

A spark advance angle is calculated depending upon the flow rate of air sucked into the engine or the pneumatic pressure in the intake manifold and upon the rotational speed of the engine. When the actual engine temperature exceeds a predetermined value higher than the engine temperature at the normal operating condition of the engine, the calculated spark advance angle is corrected to decrease.

16 Claims, 12 Drawing Figures

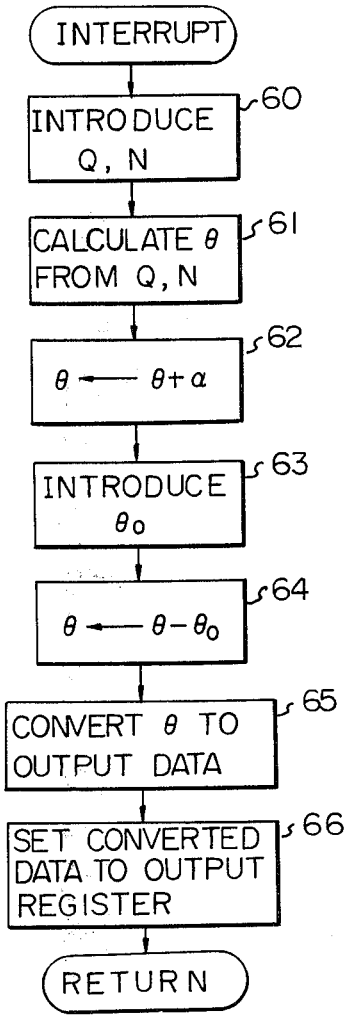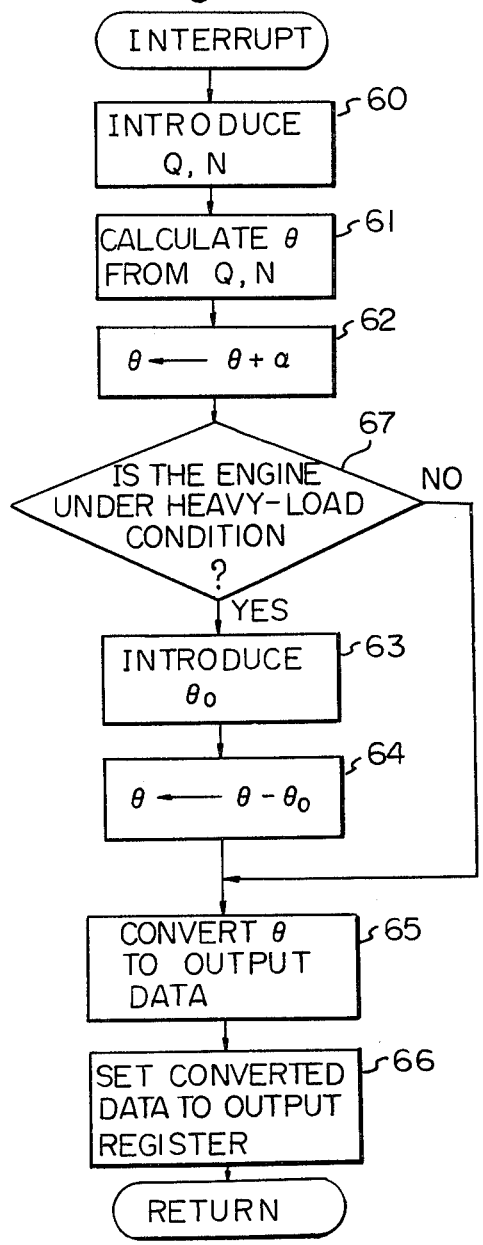

METHOD OF AND APPARATUS FOR CONTROLLING THE IGNITION TIMING OF AN INTERNAL COMBUSTION ENGINE

BACKGROUND OF THE INVENTION

The present invention relates to a method of controlling the ignition timing of an internal combustion engine.

A well-known method of controlling the ignition timing of the engine consists in detecting the flow rate of the intake air or the pneumatic pressure in the intake manifold and the rotational speed as operating condition parameters, calculating an optimum ignition timing from the detected operating condition parameters by using a predetermined function which represents the relationship between optimum ignition timings and the operating condition parameters, and practically adjusting the ignition timing responsive to the calculated value. The optimum ignition timing should be selected to a value that is advanced as much as possible in such a manner that a maximum torque can be obtained without development of knocking under any operating condition.

According to the conventional control method of this type, however, the function has been determined so that optimum ignition timings are obtained when the engine is completely warmed up and when the engine is under ordinary operating conditions. In other words, no countermeasure has been provided to cope with the cases when the temperature of the engine is excessively raised or when the engine is overheated to some extent. Therefore, when overheated, the engine tends to knock. In extreme cases, there develops pre-ignition which may cause the engine to be damaged.

SUMMARY OF THE INVENTION

It is, therefore, an object of the present invention to provide a method of and apparatus for controlling the ignition timing of an internal combustion engine, whereby knocking can be prevented even when the engine temperature is above normal so as to reliably prevent the occurrence of pre-ignition.

According to the present invention, the flow rate of air sucked into the engine or the pneumatic pressure in the intake manifold is detected to produce a first electrical signal which indicates the detected flow rate of air or the detected pneumatic pressure. The rotational speed of the engine is also detected to produce a second electrical signal which indicates the detected rotational speed. In response to the first and second electrical signals, a spark advance angle is determined which represents an optimum ignition timing at the operating condition corresponding to the detected flow rate of air or the detected pneumatic pressure and to the detected rotational speed. The temperature of the engine is detected to produce a third electrical signal which indicates the detected engine temperature, and, in response to the third electrical signal, the calculated spark advance angle is corrected so that it decreases when the detected engine temperature exceeds a predetermined value which is higher than the engine temperature at the normal operating condition. The timing of the sparks applied to the engine is controlled depending upon the spark advance angle.

The above and other related objects and features of the present invention will be apparent from the description of the present invention set forth below, with reference to the accompanying drawings, as well as from the appended claims.

BRIEF DESCRIPTION OF THE DRAWINGS

FIGS. 3 and 4 are flow diagrams illustrating one operation of the digital computer in the control circuit of FIG. 2;

FIG. 7 is a flow diagram illustrating another operation of the digital computer in the control circuit of FIG. 2;

DETAILED DESCRIPTION OF THE PREFERRED EMBODIMENTS

Figure 1:
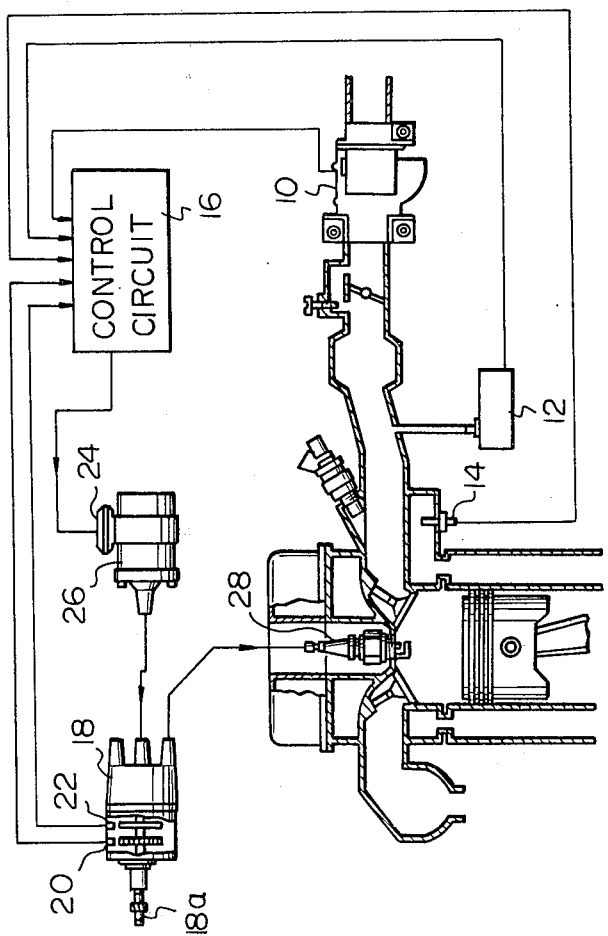
FIG. 1 is a schematic diagram of the present invention.

Referring to FIG. 1, in which an example of an ignition timing control system of an internal combustion engine, having a microcomputer according to the present invention is illustrated, a reference numeral 10 denotes an air flow sensor. The air flow sensor 10 detects the flow rate of the air sucked into the engine and generates a voltage that corresponds to a detected flow rate. A pneumatic pressure sensor 12 detects the pneumatic pressure in an intake manifold of the engine and generates a voltage corresponding to a detected pressure. A coolant temperature sensor 14 detects the temperature of the coolant of the engine and produces a voltage corresponding to a detected temperature. A control circuit 16 is served with output voltages from the air flow sensor 10, the pneumatic pressure sensor 12 and the coolant temperature sensor 14.

A distributor 18 of the engine is equipped with a first crank angle sensor 20 and a second crank angle sensor 22 which generate angular position signals every time the distributor shaft 18a rotates by predetermined angles, for example, 30° and 360° in terms of crank angles. The two angular position signals from the crank angle sensors are fed to the control circuit 16.

The control circuit 16 feeds an ignition signal to an igniter 24 which permits and interrupts the flow of a primary current to an ignition coil 26. A secondary current of a high voltage produced by the ignition coil 26 is fed to spark pulgs 28 via the distributor 18.

Figure 2:
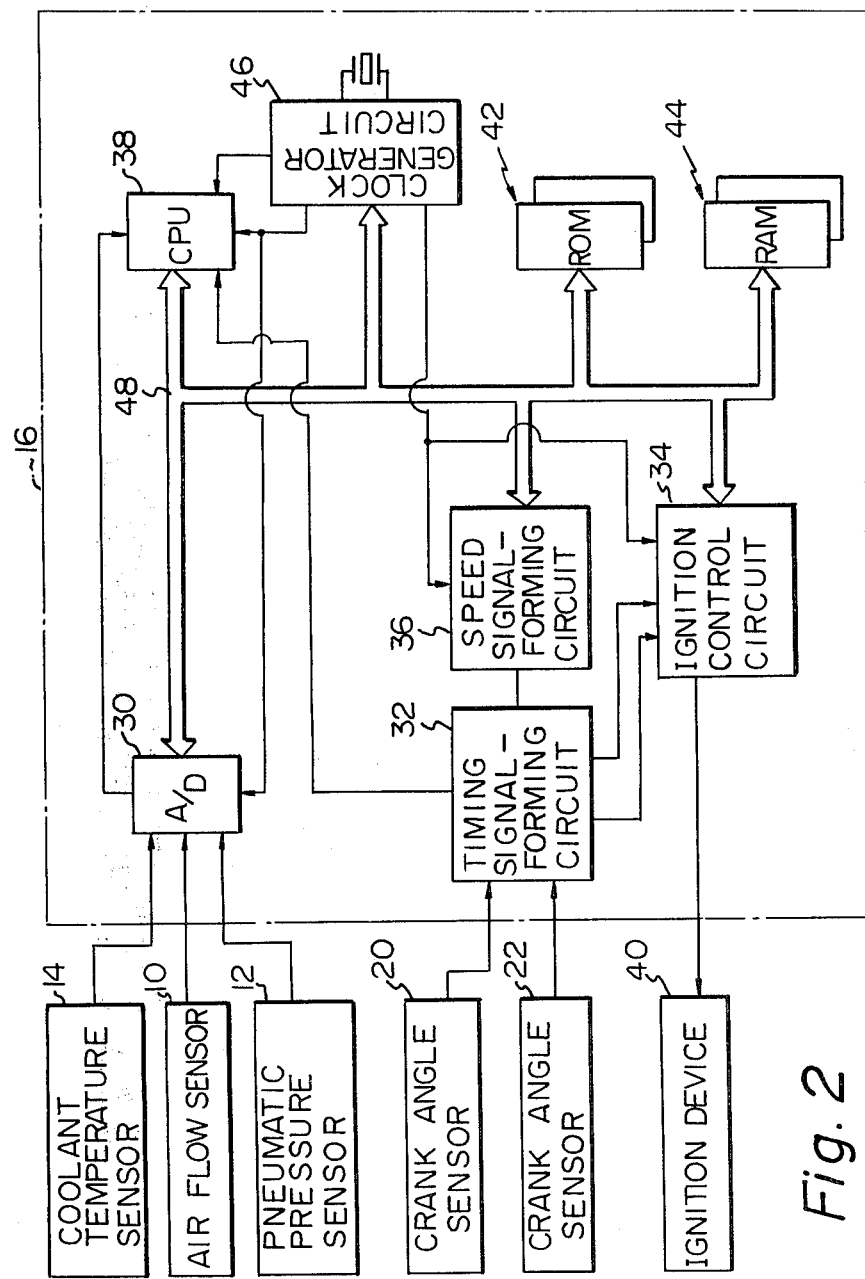
FIG. 2 is a block diagram illustrating a control circuit in the system of FIG. 1.

FIG. 2 is a block diagram illustrating an example of the control circuit 16 of FIG. 1.

Output voltages of the coolant temperature sensor 14, air flow sensor 10 and pneumatic pressure sensor 12 are fed to an A/D converter 30 having functions of an analog multiplexer and a converter, and are converted into binary signals in sequence at a predetermined conversion interval.

The angular position signal produced by the first crank angle sensor 20 at every crank angle of 30° and the second crank angle sensor 22 at every crank angle of 360°, are fed to a timing signal-forming circuit 32 which is a well known circuit. The timing signal-forming circuit 32 forms various timing signals for an ignition control circuit 34, an interrupt request signal for calculating the ignition timing, and a gate control signal which is used in a speed signal-forming circuit 36. The timing signal-forming circuit 32 may be constructed by combining flip-flop circuits and logical operation elements.

As is widely known, the speed signal-forming circuit 36 has a gate that will be opened and closed by a gate control signal having a pulse width which corresponds to the crank angle of 60° fed from the timing signal-forming circuit 32, and a counter which counts the number of clock pulses that pass through the gate when the gate is opened each time. Thus, the speed signal-forming circuit 36 forms a binary speed signal having a value that corresponds to the rotational speed of the engine.

The ignition control circuit 34 is equipped with two registers, two down counters and a flip-flop. One of the two registers receives output data related to the timing of starting to flow a current on the ignition coil 26, which output data is calculated by a central processing unit (CPU) 38. The other register receives output data related to the timing of finishing to flow of current, i.e., related to the ignition timing. The two down counters generate pulses at moments determined by the output data. The flip-flop is set and reset by the pulses from the down counters and generates an ignition signal which represents a period for carrying the electric current to the ignition coil. The ignition control circuit of this type has also been widely known. The ignition signal is fed to the ignition device 40 of FIG. 1 consisting of spark plugs 28, the districutor 18 and the ignition coil 26.

The A/D converter 30, speed signal-forming circuit 36, and ignition control circuit 34 are connected to the CPU 38, read-only memory (ROM) 42, random access memory (RAM) 44 and clock generator circuit 46 via a bus 48. The input and output data are transferred via the bus 48.

Although not diagrammatized in FIG. 2, the microcomputer is further equipped with an input/output control circuit, memory control circuit and the like in a customary manner.

In the ROM 42 have been stored beforehand a program for main processing routine, an interrupt processing program for calculating the ignition timing and other processing programs, as well as various data necessary for performing the calculation, as will be mentioned later.

In FIGS. 1 and 2, the engine is equipped with both the air flow sensor 10 and the pneumatic pressure sensor 12. The present invention, however, can be put into practice if either one of these sensors 10 and 12 is provided.

Below is illustrated the operation processed by the aforementioned microcomputer. The following description deals with the case when the air flow sensor 10 is used instead of the pneumatic pressure sensor 12.

Figure 3:
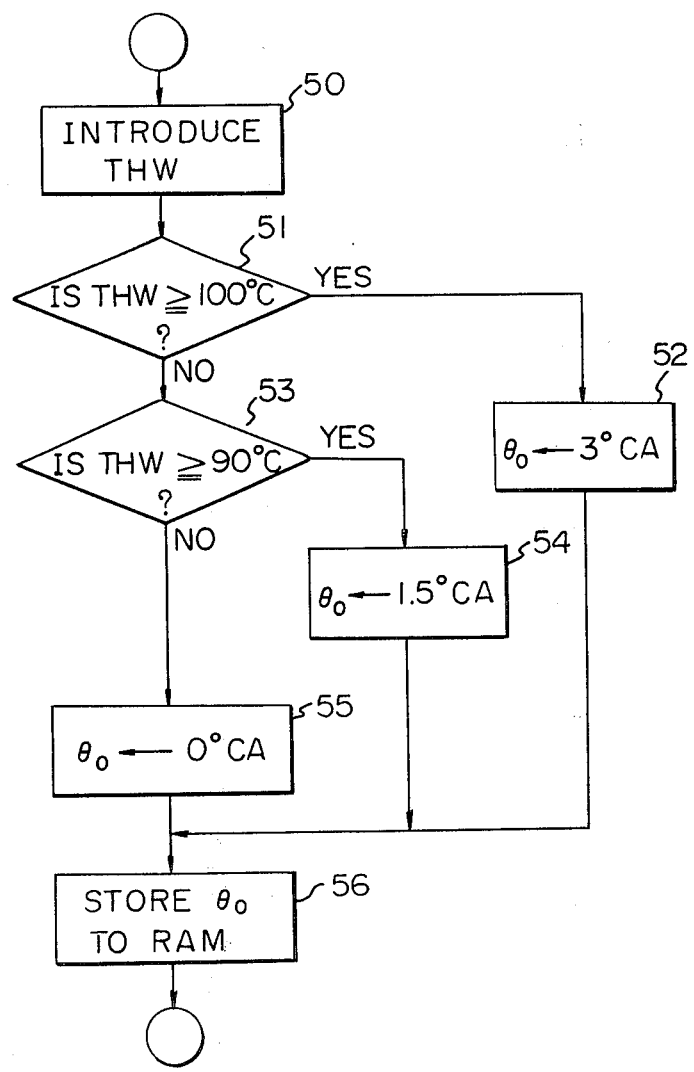

In the main processing routine, the CPU 38 executes the processing which is shown in FIG. 3. First, at a point 50 the CPU 38 introduces a detected data related to the coolant temperature THW that is subjected to the A/D conversion by the A/D converter 30 and that is stored in a predetermined region of the RAM 44. Then, at a point 51, the CPU 38 discriminates whether the coolant temperature THW is higher than 100° C. or not. When the temperature THW is higher than 100° C., the program proceeds to a point 52 where a decrement value $\theta_0$ of the spark advance angle $\theta$ is set to be $\theta_0 = 3°$ CA (3° crank angle). When the coolant temperature THW is lower than 100° C., the program proceeds to a point 53 where it is discriminated whether THW is higher than 90° C. or not. When the temperature THW is discriminated to be higher than 90° C. at the point 53, the program proceeds to a point 54 where the decrement value $\theta_0$ is set to be $\theta_0 = 1.5°$ CA. When the temperature THW is lower than 90° C., the decrement value $\theta_0$ is equalized to zero at a point 55. At a point 56, the determined decrement value $\theta_0$ is stored in a predetermined region in the RAM 44. Through the above-mentioned points 51 to 55, therefore, the decrement value $\theta_0$ is set to 3° CA when 100° C. $\leq$ THW, set to 1.5° CA when 90° C. $\leq$ THW $<$ 100° C., and set to zero when THW $<$ 90° C.

Figure 5:
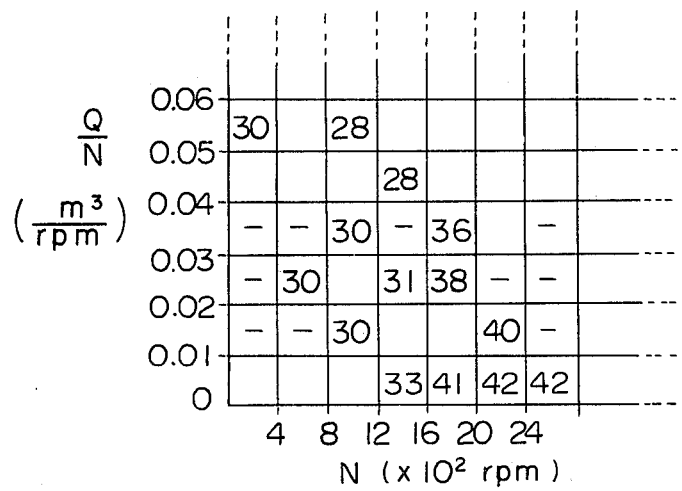
FIG. 5 is a graph illustrating the relation of the spark advance angle $\theta$ relative to the load Q/N and the rotational speed N.

The CPU 38, on the other hand, executes the processing routine for calculating the ignition timing, shown in FIG. 4, responsive to an interrupt request signal that is generated by the timing signal-forming circuit 32 at every predetermined crank angle, for example, at every crank angle of 120° in the case of a four-cycle six-cylinder engine. First, at a point 60, the CPU 38 introduces a detected data related to the flow rate Q of the intake air that is subjected to the A/D conversion by the A/D converter 30 and that is stored in a predetermined region in the RAM 44, as well as a detected data related to the rotational speed N of the engine which is fed from the speed signal-forming circuit 36 and which has been stored in a predetermined region in the RAM 44. Then, at a point 61, the CPU 38 performs the calculation for finding a spark advance angle $\theta$ from the detected data related to Q and N. The spark advance angle $\theta$ can be calculated by a variety of methods. For example, the spark advance angle $\theta$ may be found from a map, shown in FIG. 5, which has been stored in the ROM 84, and indicates a predetermined function of relation of spark advance angle $\theta$ relative to N and Q/N. The CPU 38, then, at a point 62, corrects the calculated spark advance angle $\theta$ by using a correction coefficient $\alpha$ such as warmed-up correction coefficient. Namely, at the point 62, the calculation of $\theta \leftarrow \theta + \alpha$ is performed. At a point 63, then, the CPU 38 introduces the decrement value $\theta_0$ which is calculated by the main processing routine of FIG. 3 and which is stored in the RAM 44. At a next point 64, the CPU 38 performs the calculation of $\theta \leftarrow \theta - \theta_0$ to reduce the corrected spark advance angle $\theta$ by the decrement value $\theta_0$. At a point 65, the CPU 38 calculates a crank angle between an ignition timing angle corresponding to the finally calculated spark advance angle $\theta$ and the reference angular position, calculates the time required by the crank shaft to turn the above calculated crank angle, and converts the thus calculated value into a count number of the down counter in the ignition control circuit 34. At a point 66, the converted ignition timing data is set to the register in the ignition control circuit 34. Thereafter, the interrupt processing routine of FIG. 4 is completed. The CPU 38 calculates the data related to the moment for starting the current to the ignition coil to flow by a customary manner relying upon the ignition timing data, and sets the calculated value to another register in the ignition control circuit 34.

Figure 6:
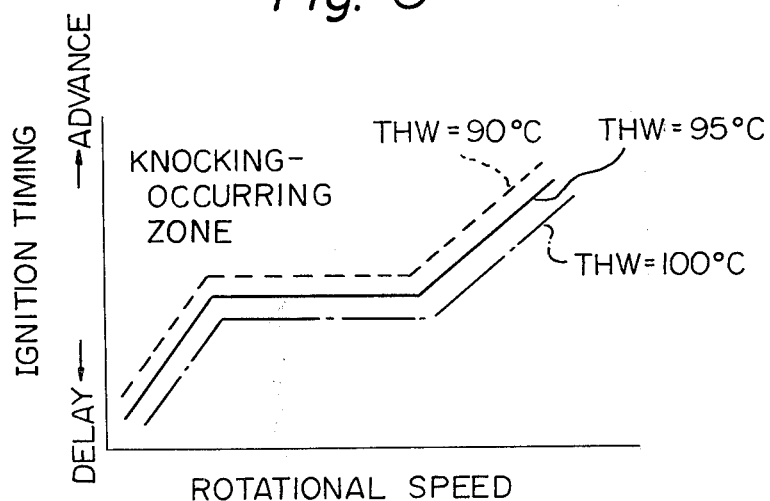
FIG. 6 is a graph illustrating the knocking zone.

Since the ignition timing is controlled by the thus calculated ignition timing data, it is possible to eliminate knocking even when the temperature of the engine is raised. In general, the bounds of the knocking zone with respect to the ignition timing tends to be changed toward the delay side responsive to the increase of the temperature of the engine (coolant temperature THW or oil temperature) when the engine is slightly overheated. Therefore, if the ignition timing is delayed when the engine temperature is high, knocking and/or pre-ignition can be reliably prevented from occurring. Although the occurrence of knocking and pre-ignition can also be prevented if the ignition timing is controlled so as to never enter into the knocking zone of FIG. 6 even when the engine temperature is excessively raised (for example, even when the coolant temperature THW is raised above 100° C.), the maximum torque cannot be obtained at the ordinary engine temperature. Therefore, it is necessary to control the ignition timing to delay only when the temperature of the engine is high.

In controlling the ignition timing to delay, more preferably effects can be obtained if the delaying amount is changed depending upon the increase of the temperature of the engine as mentioned in the foregoing embodiment.

FIG. 7 illustrates a modified embodiment of the processing routine of FIG. 4. In the processing routine of FIG. 7, the step of a point 67 is provided after the step of a point 62 to discriminate whether the engine is under heavy-load operating conditions or not. When the engine is under heavy-load operating conditions, the program proceeds to points 63 and 64 where the spark advance angle $\theta$ is decreased by $\theta_0$. Whether the engine is under heavy-load operating conditions or not, is judged by discriminating, for example, where Q/N is greater than 0.05 m³/hr·rpm or not. Other portions in the processing routine of FIG. 7 are quite the same as those of the processing routine of FIG. 4. Generally, the knocking, pre-ignition and the like occur intensively when the engine is under heavy-load operating conditions. Therefore, the ignition timing can be more effectively controlled in accordance with the processing routine of FIG. 7.

Figure 8:
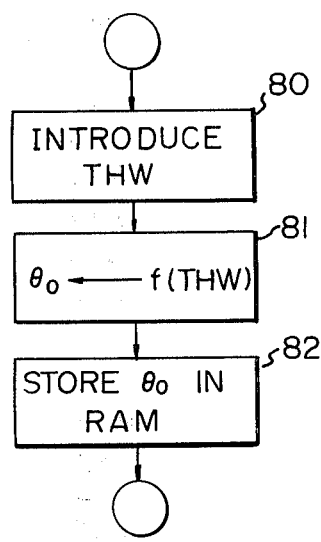
FIGS. 8 and 9 are flow diagrams illustrating further operation of the digital computer in the control circuit of FIG. 2.
Figure 9:
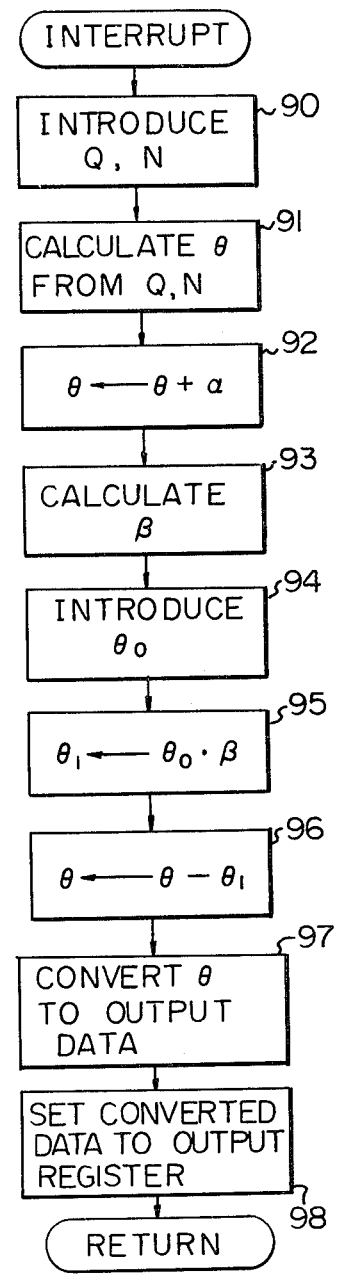

FIGS. 8 and 9 illustrate a further embodiment of the processing routine by the microcomputer.

In this embodiment, the CPU 38 excecutes the processing of FIG. 8 during the main processing routine. First, at a point 80, the CPU 38 introduces from the RAM 44 the detected data related to the coolant temmperature THW, and at a point 81, calculates the decrement value $\theta_0$ of the spark advance angle $\theta$ from a relation $\theta_0 = f(THW)$ of FIG. 10 between the coolant temperature THW and the decrement value $\theta_0$. Then, at a point 82, the calculated decrement value $\theta_0$ is stored in a predetermined region in the RAM 44.

The CPU 38 also executes the interrupt processing routine of FIG. 9 instead of the interrupt processing routine of FIG. 4. Steps at points 90, 91 and 92 perform quite the same processings as those of the steps at the points 60, 61 and 62 of FIG. 4, respectively. At a point 93, the CPU 38 calculates a correction coefficient $\beta$ depending upon the rotational speed of the engine or the load. Namely, the CPU 38 at the point 93 calculates the coefficient $\beta$ from a function of relation between the rotational speed N of the engine and the correction coefficient $\beta$ shown in FIG. 11, or calculates the coefficient $\beta$ from a function of relation between the load Q/N of the engine and the correction coefficient $\beta$ shown in FIG. 12. Then, at a point 94, the CPU 38 introduces the decrement value $\theta_0$ which is calculated by the main processing routine of FIG. 8 and which is stored in the RAM 44. At a point 95, the CPU 38 multiplies the decrement value $\theta_0$ by the coefficient $\beta$ to finally obtain the decrement value $\theta_1$. Then, at a point 96, the spark advance angle $\theta$ is reduced by the corrected decrement value $\theta_1$. That is, the step of the point 96 performs the calculation of $\theta \leftarrow \theta - \theta_1$. At the subsequent points 97 and 98, the CPU 38 perform quite the same processings as that of the points 65 and 66 of FIG. 4, respectively.

Figure 10:
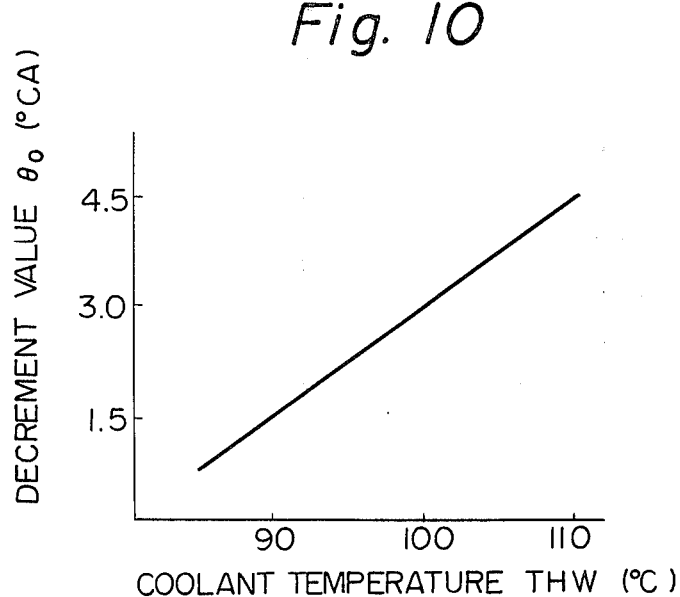
FIG. 10 is a graph illustrating the relation of the decrement valve $\theta_0$ of the spark advance angle $\theta$ relative to the coolant temperature THW.
Figure 11:
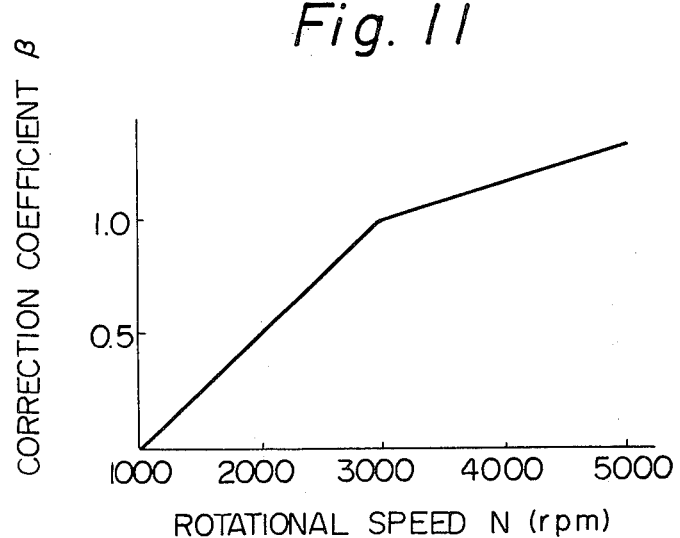
FIG. 11 is a graph illustrating the relation of the coefficient $\beta$ relative to the rotational speed N.
Figure 12:
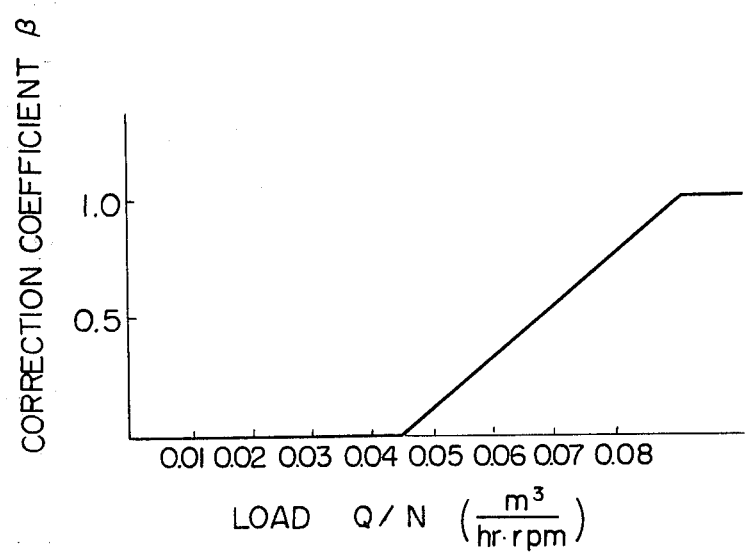
FIG. 12 is a graph illustrating the relation of the coefficient $\beta$ relative to the load Q/N.

According to the above-mentioned processing routines of FIGS. 8 and 9, the decrement value $\theta_0$ is given by the function f(THW) of characteristics shown in FIG. 10 responsive to the coolant temperature THW, in addition to the effects by the processing routines of FIG. 3 and FIG. 4 or FIG. 7. Therefore, it is possible to obtain an optimum and precise decrement value of the spark advance angle $\theta$. Moreover, since the decrement value $\theta_0$ is corrected by the coefficient $\beta$ having characteristics as shown in FIG. 11 or 12 depending upon the rotational speed N of the engine or upon the load Q/N, it is possible to obtain an optimum and precise decrement value of the spark advance angle $\theta$. Consequently, the ignition timing is controlled to an optimum value which helps obtain a maximum torque over a range that does not allow knocking.

According to the above-mentioned embodiment, the flow rate Q of the intake air and the rotational speed N are utilized as parameters of operating conditions of the engine. However, it is of course allowable to utilize the pneumatic pressure in the intake manifold and the rotational speed as parameters of operating conditions of the engine. It is because, the pneumatic pressure in the intake manifold can be regarded as being nearly equivalent to Q/N. Further, in addition to the coolant temperature THW, the temperature of the engine can be represented by the temperature of the engine oil.

According to the present invention as illustrated in detail in the foregoing, the ignition timing is controlled to delay when the temperature of the engine is excessively raised or when the engine is overheated. Therefore, it is possible to effectively restrain the occurrence of knocking. Consequently, the knocking sound is eliminated, the noise level is reduced, and the driver is liberated from uncomfortable feelings. This fact helps greatly improve the drive feeling of the engine. Furthermore, since the ccurrence of pre-ignition is eliminated, the reliability of the engine can be enhanced. Moreover, the consumption of fuel is reduced since the ignition timing is delayed only under the heavy-load conditions, but is not delayed under light-load to medium-load conditions.

As many widely different embodiments of the present invention may be constructed without departing from the spirit and scope of the present invention, it should be understood that the present invention is not limited to the specific embodiments described in this specification, except as defined in the appended claims.

We claim:

1. A method of controlling the ignition timing of an internal combustion engine having an intake manifold, said method comprising the steps of:

generating a first electrical signal related to one of the flow rate of air sucked into the engine and the pneumatic pressure in the intake manifold;

generating a second electrical signal related to a rotational speed of said engine;

calculating, in response to said first and second electrical signals, a spark advance angle which represents an optimum ignition timing at the operating conditions corresponding to said first and second electrical signals;

generating a third electrical signal related to a temperature of said engine;

correcting, in response to said third electrical signal, said calculated spark advance angle to decrease by a decrement value which is determined depending upon the detected engine temperature, when the detected engine temperature exceeds a predetermined value which is higher than the engine temperature at the normal operating condition, said decrement value being increased when the detected engine temperature is increased; and controlling the timing of the sparks applied to the engine depending upon said corrected spark advance angle.

2. A method as claimed in claim 1, wherein said decrement value is continuously increased when the detected engine temperature is increased.

3. A method as claimed in claim 1, wherein said decrement value is stepwise increased when the detected engine temperature is increased.

4. A method as claimed in claim 1, 2 or 3 wherein said correcting step includes steps of:

generating a fourth electrical signal related to the load on said engine; and inhibiting, in response to said produced fourth electrical signal, said correcting step from being executed when the detected engine load is lighter than a predetermined load.

5. A method as claimed in claim 4, wherein said load detecting step includes a step of calculating the load of the engine depending upon one of (1) a detected flow rate of air and a detected rotational speed, and (2) a detected pneumatic pressure.

6. A method as claimed in claim 1, 2 or 3 wherein said correcting step includes steps of:

generating a fourth electrical signal related to a detected engine load; and correcting, in response to said produced fourth electrical signal, said decrement value to be increased when the detected engine load is increased.

7. A method as claimed in claim 6, wherein said load detecting step includes a step of calculating the load of the engine depending upon one of (1) a detected flow rate of air and a detected rotational speed, and (2) a detected pneumatic pressure.

8. A method as claimed in claim 1, 2 or 3, wherein said correcting step includes a step of correcting, in response to said produced second electrical signal, said decrement value to be increased when the detected rotational speed is increased.

9. Apparatus for controlling the ignition timing of an internal combustion engine having an intake manifold, said apparatus comprising:

means for generating a first electrical signal related to one of the flow rate of air into said engine and the pneumatic pressure in said intake manifold;

means for generating a second electrical signal related to the rotational speed of said engine;

means for generating a third electrical signal related to the temperature of said engine;

processing means for (1) determining, in response to said first and second electrical signals, a spark advance angle which represents an optimum ignition timing at the operating condition corresponding to said first and second signals, and (2) decreasing said spark advance angle in response to said third electrical signal by a decrement value which is determined depending upon said engine temperature, when said engine temperature exceeds a predetermined value which is higher than the engine temperature at the normal operating condition, said decrement value being increased when said engine temperature is increased; and means for controlling the timing of the sparks applied to the engine depending upon said spark advance angle.

10. Apparatus as in claim 12, wherein said decrement value is continuously increased when said engine temperature is increased.

11. Apparatus as in claim 9, wherein said decrement value is stepwise increased when said engine temperature is increased.

12. Apparatus as in claim 9, 10 or 11 wherein:

said apparatus further comprises means for generating a fourth electrical signal related to the load on said engine; and said processing means includes means for inhibiting, in response to said produced fourth electrical signal, said decreasing function when said engine load is lighter than a predetermined load.

13. Apparatus as in claim 12, wherein said fourth signal generating means and said processing means includes means for determining the load of the engine depending upon one of (1) a flow rate of air into said engine and said rotational speed, and (2) pneumatic pressure in said intake manifold.

14. Apparatus as in claim 9, 10, or 11 wherein:

said apparatus further comprises means for generating a fourth electrical signal related to the load on said engine; and said processing means is responsive to said fourth electrical signal to increase said decrement value when said engine load is increased.

15. Apparatus as in claim 14, wherein said fourth signal generating means and said processing means includes means for determining the load of the engine depending upon one of (1) a flow rate of air into said engine and said rotational speed, and (2) pneumatic pressure in said intake manifold.

16. Apparatus as in claim 9, 10 or 11, wherein said processing means decreasing function increases said decrement value, in response to said second electrical signal, when the rotational speed is increased.

* * * * *